United States Patent [19]

Christink

[11] 4,033,184

[45] July 5, 1977

[54] OUTBOARD MOTOR SERVICE TANK

[76] Inventor: Maurice O. Christink, 3966 Bloor St. West, Islington, Ontario, Canada

[22] Filed: Aug. 24, 1976

[21] Appl. No.: 717,239

[52] U.S. Cl. .............................................. 73/117.1

[51] Int. Cl.² ........................................ G01M 15/00

[58] Field of Search ........... 73/117.1, 148; 206/305

[56] References Cited

UNITED STATES PATENTS

| | | | |
|---|---|---|---|
| 2,662,399 | 12/1953 | Chapman | 73/117.1 |
| 3,487,426 | 12/1969 | Hoffmann | 73/117.1 |

*Primary Examiner*—Jerry W. Myracle

*Attorney, Agent, or Firm*—Eugene V. Mandel; Allen D. Brufsky

[57] ABSTRACT

A see-thru portable collapsible outboard motor servicing tank with inlet, exhaust and drain fittings.

5 Claims, 4 Drawing Figures

OUTBOARD MOTOR SERVICE TANK

BACKGROUND OF THE INVENTION

This invention relates to test equipment, and, in particular to equipment for outboard motors.

PRIOR ART

The need for test and servicing tanks for outboard motors has been apparent for some years, and started being satisfied with home-made equipment. Tanks disclosed by publication have been few. Chapman's U.S. Pat. No. 2,662,399, Read in U.S. Pat. No. 3,240,056 and Hunziker in U.S. Pat. Nos. 3,109,304 and 3,543,573 all disclose test tanks for outboard motors, but none of the disclosures are for see-thru portable collapsible tanks with exhaust below inlet.

SUMMARY

It is therefore an object of this invention to overcome the limitations and disadvantages in the outboard motor test tanks in the prior art and currently available in the market.

One of the objects of the invention is to provide an outboard motor test tank embodying improved principles of design and construction.

An important object of the invention is to provide an outboard motor test tank which is comprised of a minimum number of simple durable parts and components which can be economically manufactured and readily assembled, enabling the tank to be attached to the motor, rather than the motor to the tank as in the prior art.

A significant object of the invention is to provide an outboard motor test tank so designed and constructed that it can be readily applied to almost any typical outboard motor now in use.

Another object of the invention is to provide an outboard motor servicing and test tank capable of easy stowage and transportation be being made collapsible.

A further object of the invention is to provide test tanks that permit study of the propeller and other action, i.e., engagement of forward, neutral and reverse gear, by watching through transparent walls.

Yet another object of the invention is to preclude back up into the inlet lines and a reduction of cavitation in the tank.

An outboard motor servicing and test tank, according to the principles of the invention, comprises a see-thru collapsible tank having an exhaust opening below the inlet fitting.

Further objects and advantages of this invention will appear more clearly from the following description of a non limiting illustrative embodiment and the accompanying drawings in which like numerals designate like parts throughout the several views.

DESCRIPTION OF THE DRAWINGS

Briefly summarized, a preferred embodiment of the invention is described in conjunction with an illustrative disclosure thereof in the accompanying drawings, in which.

DESCRIPTION OF THE TYPICAL EMBODIMENT

Figure 1:
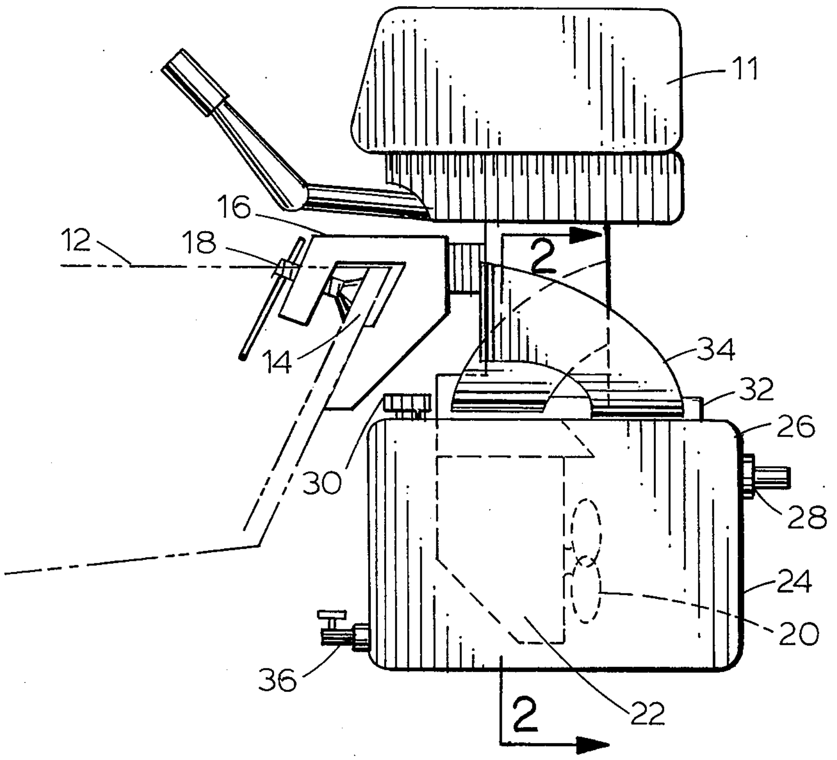
FIG. 1 is a side elevation view representing the tank with an outboard motor mounted in accordance with the principles of this invention.
Figure 2:
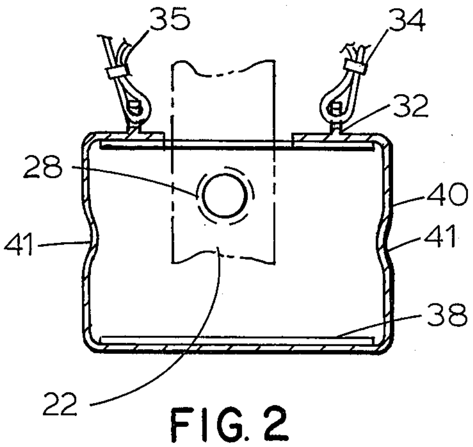
FIG. 2 is a rear elevation view of the tank.
Figure 3:
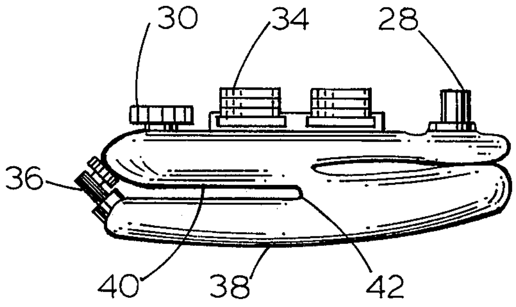
FIG. 3 is a view illustrating a collapsed tank ready for storage or transportation.
Figure 4:
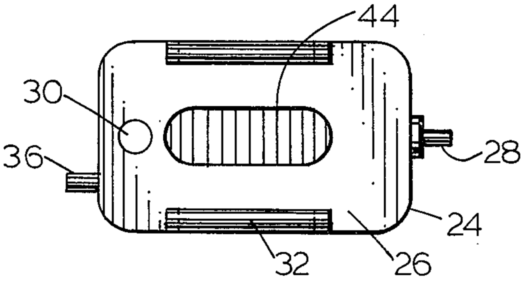
FIG. 4 is a top view of the tank.

In the drawings an outboard motor 11 service tank 24 embodying features of the invention is illustrated with the motor 11 mounted by frame 16 and clamp 18 to a boat 12 transom 14 although the motor 11 could just as well be mounted to any other object such as sawhorses, motor stands or the like.

The tank 24 is provided with lugs 32 for anchoring to the motor 11 by means of such holding devices as straps 34 which may be adjustable by means of buckles 35. Motor 11 drive 22 mounting propeller 20 is inserted through a suitable opening 44 in the top of tank 24. Cooling water may enter the tank 24 through inlet fitting 30 in the top of tank 24 to which a garden hose may be connected. Exhaust gases and excess cooling water can exit from tank 24 through exhaust fitting 28. Tank may be provided with a drain fitting 36.

Top and bottom of tank 24 may be made rigid and reinforced by members 26, 38 which may be hard boards, metal, plastic or other known stiffening material.

Exhaust fitting 28 must be lower than inlet fitting 30 and the top of tank 24 to provide an air gap, to preclude backup into the inlet, and to assist in breaking a vacuum lock.

Tank 24 is preferably made of a lightweight material such as plastic to be readily portable. For easy stowage and portability, it is preferred to make the tank collapsible. This may be accomplished in several ways, including making the top and bottom of the tank rigid and the side walls flexible 40 to fold readily 42 at points 41.

The tank 24 is preferably at least partly clear to permit the user to observe the action within the tank.

The coolant water level and temperature may be maintained by readily flowing water through the inlet fitting.

By using this tank setup, a motor 11 can be cranked over and run a few times while the boat is out of the water, as during winter storage. Of course, tuning up and checking out a motor can be accomplished with the boat out of the water.

It is presumed that the motor operator will run the motor in neutral at low speed. To move the propeller, it should be done at low speed for a short while. To run the motor at high speed in gear, the propeller should be removed. These precautions are necessary because the tank is relatively small.

The tank with its fittings including mounting lugs can be made of known materials by known manufacturing methods.

From the foregoing, the construction and operation of the device will be readily understood and further explanation is believed superfluous.

The invention includes all novelty residing in the description and drawings. It is obvious to those skilled in the art that various minor changes can be made without departing from the concept of this invention and all such as fall within the reasonable scope of the appended claims are included.

What is claimed is:

1. A sevicing tank for outboard motors and the like comprising a tank compartment having an upper portion defining a suitable opening for admitting an outboard motor's propeller and gear, and having lugs for attaching to the motor; and having an inlet fitting for liquid admission; and having an exhaust opening provided in a surface of the tank at a point lower than the inlet; the tank intended to contain cooling water; and the lower exhaust opening precluding backup into the inlet and permitting gas escape to reduce cavitation.

2. A tank as in claim 1 comprising transparent material to permit study of the internal action.

3. A tank as in claim 1 made collapsible for easy storage and transportation.

4. A tank as in claim 3 wherein the tank has side walls that are flexible to permit collapsing, and the upper portion of the tank is substantially rigid.

5. A tank as in claim 1 further comprising a drain fitting in the lower portion of the tank.

* * * * *